United States Patent
Azechi et al.

(10) Patent No.: US 6,734,250 B2
(45) Date of Patent: May 11, 2004

(54) ELECTRICALLY CONDUCTIVE SILICONE RUBBER COMPOSITION

(75) Inventors: Syuuichi Azechi, Gunma-ken (JP); Tsutomu Nakamura, Gunma-ken (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 127 days.

(21) Appl. No.: 09/931,029

(22) Filed: Aug. 17, 2001

(65) Prior Publication Data

US 2002/0049274 A1 Apr. 25, 2002

(30) Foreign Application Priority Data

Aug. 17, 2000 (JP) ........................................ 2000-247413

(51) Int. Cl.$^7$ .............................................. C08L 83/00

(52) U.S. Cl. ...................... 524/588; 524/439; 524/440; 528/15; 528/24; 528/32; 252/511; 252/514; 428/405; 428/630; 428/570

(58) Field of Search ............................. 528/24, 15, 32, 528/31; 428/570, 630, 402, 403, 404, 447, 548, 561, 552, 565; 524/588, 439, 440; 252/511, 514

(56) References Cited

U.S. PATENT DOCUMENTS

| | | | | | |
|---|---|---|---|---|---|
| 4,419,279 A | * | 12/1983 | Abrams | ...................... | 252/514 |
| 4,777,205 A | * | 10/1988 | La Scola et al. | ............. | 524/440 |
| 5,384,075 A | * | 1/1995 | Okami | ....................... | 252/511 |
| 5,405,896 A | * | 4/1995 | Fujiki et al. | ................. | 524/265 |
| 5,932,145 A | * | 8/1999 | Mitani et al. | ................ | 252/511 |
| 6,241,914 B1 | * | 6/2001 | Schleifstein | ................ | 252/500 |
| 6,414,078 B1 | * | 7/2002 | Fukushima et al. | ......... | 524/588 |
| 6,465,550 B1 | * | 10/2002 | Kleyer et al. | ............... | 524/268 |
| 6,469,090 B1 | * | 10/2002 | Azechi et al. | .............. | 524/492 |

FOREIGN PATENT DOCUMENTS

EP 653463 A2 * 5/1995 ........... C08L/83/07

* cited by examiner

*Primary Examiner*—Robert Dawson
*Assistant Examiner*—Marc S. Zimmer
(74) *Attorney, Agent, or Firm*—Birch, Stewart, Kolasch & Birch, LLP

(57) ABSTRACT

A silicone rubber composition comprising (A) an organopolysiloxane having at least two aliphatic unsaturated groups, (B) finely divided silica, (C) a metal powder or an electrically conductive metal-plated powder, (D) an adhesive aid, and (E) a curing agent cures into silicone rubber having a low volumetric resistivity and a stable high conductivity, exhibiting improved adhesion to resin and metal substrates, and thus suitable as electrically conductive parts and electrical contacts in electrical equipment.

14 Claims, No Drawings

ELECTRICALLY CONDUCTIVE SILICONE RUBBER COMPOSITION

BACKGROUND OF THE INVENTION

1. Field of the Invention

The present invention relates to electrically conductive silicone rubber compositions having improved adhesion, which compositions are suitable for use in fields that require high electrical conductivity, for example, as current contact parts in electrical components and mobile electrical units, and sealants in electromagnetic shields, office equipment rollers, antistatic members, and connectors.

2. Prior Art

In the fields of electrical components and mobile electrical units requiring high electrical conductivity in their current contact portions and electromagnetic shields or the like requiring high electrical conductivity in their seals, such parts are often formed of silicone rubber compositions loaded with high-conductivity fillers. Where bond to resins or metals is additionally required, an adhesive primer must be applied to the bond surface before the rubber is molded thereto.

Undesirably, many primers contain solvents which give rise to environmental and working problems and also prolong the working time. Also, to lower the electrical resistance of silicone rubber, a large amount of highly conductive filler must be added. This increases the surface area of filler exposed on the rubber surface, with a possibility that mere application of the primer fails to provide sufficient adhesion.

SUMMARY OF THE INVENTION

An object of the invention is to provide an electrically conductive silicone rubber composition which cures into a part having a stable high conductivity and improved self adhesiveness.

It has been found that by blending an organopolysiloxane having aliphatic unsaturated groups with finely divided silica, a metal powder or an electrically conductive powder in the form of metal-plated inorganic filler or resin particles, and an adhesive aid, there is obtained an electrically conductive silicone rubber composition which cures into a part having a low volumetric resistivity, a stable high conductivity and improved self adhesiveness and is thus suitable as electrically conductive parts and electrical contacts in electrical equipment.

The invention provides an electrically conductive silicone rubber composition having improved adhesion, comprising (A) 100 parts by weight of an organopolysiloxane having at least two aliphatic unsaturated groups in a molecule,
(B) 0.1 to 100 parts by weight of finely divided silica,
(C) 30 to 700 parts by weight of a metal powder or an electrically conductive metal-plated powder,
(D) 0.1 to 20 parts by weight of an adhesive aid, and
(E) a curing agent in an amount sufficient to cure the organopolysiloxane.

Also contemplated herein is an article comprising a substrate of a metal or resin and a coating of the conductive silicone rubber composition applied and cured to the substrate without a primer, the cured coating of the composition being integrated with the substrate.

DETAILED DESCRIPTION OF THE INVENTION

Component (A) of the electrically conductive silicone rubber composition of the invention is an organopolysiloxane at least two aliphatic unsaturated groups, especially alkenyl groups in a molecule. Preferably, the organopolysiloxane has the average constitutional formula (1):

$$R^1_a SiO_{(4-a)/2} \qquad (1)$$

wherein $R^1$ is a substituted or unsubstituted monovalent hydrocarbon group of 1 to 12 carbon atoms, 0.001 to 20 mol % of the $R^1$ groups are alkenyl groups, and "a" is a positive number from 1.5 to 2.8.

In the alkenyl-bearing organopolysiloxane of formula (1), exemplary $R^1$ groups are substituted or unsubstituted monovalent hydrocarbon groups having 1 to 12 carbon atoms, and preferably 1 to 8 carbon atoms, including alkyl groups such as methyl, ethyl, propyl, isopropyl, isobutyl, butyl, tert-butyl, pentyl, neopentyl, hexyl, cyclohexyl, octyl, nonyl and decyl; alkenyl groups such as vinyl, allyl, propenyl, isopropenyl, butenyl, isobutenyl, hexenyl, cyclohexenyl, and octenyl; aryl groups such as phenyl, tolyl, xylyl and naphthyl; aralkyl groups such as benzyl, phenylethyl and phenylpropyl; and halo- and cyano-substituted hydrocarbon groups such as chloromethyl, bromoethyl, 3,3,3-trifluoropropyl, 3-chloropropyl and cyanoethyl.

The substituent groups may be the same or different. The preferred content of alkenyl groups is 0.001 to 20 mol %, especially 0.01 to 10 mol % of the $R^1$ groups. As noted above, it is essential for the organopolysiloxane to have at least two alkenyl groups in a molecule. The $R^1$ groups may be any of the above-exemplified ones although the preferred alkenyl group is vinyl and the preferred other substituent groups are methyl and phenyl. In formula (1), "a" stands for a positive number from 1.5 to 2.8, and preferably from 1.8 to 2.9.

The organopolysiloxane of formula (1) may have a linear molecular structure or a branched molecular structure including $R^1 SiO_{3/2}$ units and $SiO_{4/2}$ units. Preferably it is a linear diorganopolysiloxane having a backbone that is basically composed of recurring $R^1_2 SiO_{2/2}$ diorganosiloxane units, and which is capped at both ends of the molecular chain with $R^1_3 SiO_{1/2}$ triorganosiloxy groups. Most preferably, the diorganopolysiloxane is capped with trivinylsilyl, divinylmethylsilyl or vinyldimethylsilyl groups at both ends of the molecular chain.

The alkenyl groups in the molecule may be bonded to silicon atoms either at the ends of the molecular chain or at the middle of the chain, or both. The presence of alkenyl groups bonded to at least the silicon atoms at both ends of the molecular chain is preferable in terms of the cure of the composition and the cured physical properties.

The alkenyl-bearing organopolysiloxane preferably has an average degree of polymerization in the range of about 100 to 3,000, especially about 200 to 2,000 when the composition is liquid, and in the range of about 3,000 to 100,000, especially about 4,000 to 20,000 when the composition is of millable type.

The alkenyl-bearing organopolysiloxane may be prepared by known methods. According to one suitable method, preparation may involve carrying out equilibrium reaction between an organopolysiloxane and a hexaorganodisiloxane in the presence of an alkali or acid catalyst.

Component (B) of the silicone rubber composition is finely divided silica. Its type is not critical and any silica powder that is used in conventional silicone rubber compositions, with the exception of metal-plated silica powder, may be employed. Illustrative examples include precipitated silica, fumed silica and fired silica having a specific surface area of at least 50 m²/g, and especially 50 to 400 m²/g, as measured by the BET method. Other suitable examples include ground quartz and diatomaceous earth having an average particle size of up to 50 μm, and preferably within a range of 0.1 to 20 μm.

The silica powder may be used directly without modification. Alternatively, the silica powder may be used in the form of a hydrophobic silica powder after surface treatment with a silazane such as hexamethyldisilazane, a silane such as trimethylchlorosilane or an organosilicon compound such as polymethylsiloxane. The silica powder may also be rendered hydrophobic by blending it with a surface treatment agent during compounding.

The finely divided silica (B) is incorporated in an amount of 1 to 100 parts by weight, and preferably 2 to 50 parts by weight, per 100 parts by weight of the organopolysiloxane (A). With less than 1 part of silica, the mechanical strength of the cured product may become low. The use of more than 100 parts of silica tends to obstruct proper loading of the conductive filler (C), adversely affecting the workability of the composition.

Component (C) is a metal powder or a conductive metal-plated powder (conductive powder having a metal plating surface layer) whose purpose is to confer the silicone rubber composition of the invention with electrical conductivity.

No limitations are imposed on the particle size of the metal powder, although an average particle size within a range of 0.05 to 100 μm, and especially 0.1 to 10 μm, is preferred.

The metal powder may have any suitable particle shape, including granular, dendritic or flake-like, or may be of irregular shape. Alternatively, a mixture of metal powders having a combination of these shapes may be used. To form a silicone rubber of low electrical resistance, it is desirable for the metal particles to be partially linked rather than dispersed in a completely discrete state.

Illustrative examples of metal powders that may be used in the invention include silver powder, gold powder and nickel powder, of which silver powder is especially preferred.

Any silver powder may be used without particular limitation, including those produced by electrolysis, grinding, heat treatment, atomization or chemical processes. Any suitable known apparatus may be used to produce ground silver powder, including a stamp mill, ball mill, vibratory mill, hammer mill, pressure rollers or mortar and pestle. Nor is there any particular limitation on the conditions for rolling silver powder composed of reduced silver, atomized silver, electrolytic silver or mixtures of two or more thereof. Rather, it is essential to select such conditions according to such considerations as the particle size and shape of the silver powder to be used.

The conductive metal-plated powders that can be used herein as component (C) include metal-plated inorganic fillers and organic resin powders, for example, silica particles, glass beads, phenolic resin particles, and (meth) acrylic resin particles which are plated with gold or silver. Of these, metal-plated silica powder is preferred. Metal-plated silica powder consists of silica particles surfaces of which have been coated by metal plating. Examples of suitable plating metals include gold, silver and nickel, of which gold and nickel are especially preferred.

Preferably the metal-plated silica powder has a specific surface of at most 1 m$^2$/g. A surface area greater than 1 m$^2$/g may result in poor dispersibility when the powder is added to the silicone rubber composition.

The metal-plated silica powder preferably has a construction comprising silica covered with a nickel layer which in turn is covered with a gold layer. A four-layer construction of silica/silicon compound/nickel/gold in which a silicon compound lies between the silica and the nickel is especially advantageous for improving adhesion between the metal and the silica. Preferred examples of the silicon compound include carbon-functional (CF) silane monomers such as those made by Shin-Etsu Chemical Co., Ltd. under the trade name designations KBM-603, KBM-903, KBE-603 and KBE-903, and silicon-based polymeric compounds with reducing properties.

The method of producing the metal-plated silica powder is not subject to any particular limitation. A typical example of production includes the following steps.

(1) A first step in which silica powder is treated with a silicon compound, preferably one with reducing properties, to form a layer of the silicon compound on the surface of the silica.
(2) A second step in which the powder resulting from the first step is treated with a solution containing a metal salt composed of metal having a standard redox potential of at least 0.54 to induce the deposition of a colloid of the metal onto the silicon compound layer that has been formed over the silica surface.
(3) A third step in which electroless nickel plating is carried out using the above metal colloid as the catalyst so as to form a layer of metallic nickel on the surface of the silicon compound layer.
(4) A fourth step in which gold plating is carried out, thereby forming a layer of gold on the metallic nickel layer. These four steps are described more fully below.

The silica starting material used to form the metal-plated silica powder is a powder composed of silicon dioxide, and thus has a high heat resistance. The particles making up the silica starting material may have any suitable shape, such as granular, fibrous or flake-like, although a spherical shape, because it has the smallest specific surface area for a given particle size, is desirable for minimizing the amount of plating metal (typically nickel or gold) used and for achieving high loading in the silicone rubber composition. Such silica can be easily prepared by such methods as burning chlorosilane, hydrolyzing alkoxysilane, oxidizing gasified metallic silicon or fusing silica powder. To lower the specific surface area, it is desirable for the silica particles to have no interior cavities that communicate with the particle surface. In this sense, the use of fused silica is especially preferred. The silica powder has an average particle size in a range of 0.01 to 1,000 μm, and preferably 0.1 to 100 μm. At less than 0.01 μm, the specific surface area becomes large and may require the use of such a large amount of plating metal as to be prohibitively expensive. On the other hand, at a particle size greater than 1,000 μm, the metal-plated silica powder may be difficult to mix into the silicone rubber composition.

Production of the metal-plated silica powder according to the invention is preferably carried out by treating the above-described silica powder with a silicon compound having reducing properties so as to form a layer of the silicon compound on the surface of the silica.

Examples of the reducing silicon compounds used herein include, in addition to the carbon-functional silane monomers referred to above, polysilanes, polycarbosilanes, polysiloxanes and polysilazanes having silicon-silicon or silicon-hydrogen bonds. Of these, polysiloxanes with hydrogen atoms directly bonded to silicon atoms and polysilanes are especially preferred.

Exemplary silanes include polymeric compounds of the following general formula which have silicon-silicon bonds on the main chain.

$$(R^2_m R^3_n X_p Si)_q \qquad (2)$$

In formula (2), $R^2$ and $R^3$ are each independently a hydrogen or a substituted or unsubstituted monovalent hydrocarbon group such as an aliphatic, alicyclic or aromatic monovalent hydrocarbon group. Suitable aliphatic or alicyclic monovalent hydrocarbon groups are those having 1 to 12 carbons, and especially 1 to 6 carbons, for example, alkyl groups, such as methyl, ethyl, propyl, butyl, pentyl and hexyl and cycloalkyl groups, such as cyclopentyl and cyclohexyl. Suitable aromatic monovalent hydrocarbon groups include those having 6 to 14 carbons, and preferably 6 to 10 carbons, such as phenyl, tolyl, xylyl, naphthyl and benzyl. Suitable substituted monovalent hydrocarbon groups include the aforementioned unsubstituted monovalent hydrocarbon groups on which some or all of the hydrogen atoms have been replaced with substituents such as halogen atoms, alkoxy groups, amino groups or aminoalkyl groups. Specific examples of such substituted monovalent hydrocarbon groups include monofluoromethyl, trifluoromethyl and m-dimethylaminophenyl.

In above formula (2), X may be the same type of group as $R^2$, an alkoxy group, a halogen atom, an oxygen atom or a nitrogen atom. Suitable alkoxy groups include those having 1 to 4 carbons, such as methoxy, ethoxy and isopropoxy. Suitable halogen atoms include fluorine, chlorine and bromine. Of the above, it is generally preferable for X to be methoxy or ethoxy.

In formula (2), the letter m is from 0.1 to 1, and preferably from 0.5 to 1; n is from 0.1 to 1, and preferably from 0.5 to 1; and p is from 0 to 0.5, and preferably from 0 to 0.2. The sum m+n+p is from 1 to 2.5, and preferably from 1.5 to 2. In addition, q is an integer from 2 to 100,000, and preferably from 10 to 10,000.

The silicon compound having hydrogen atoms bonded directly to silicon atoms (Si—H groups) may be any organohydrogenpolysiloxane with hydrogen atoms bond directly to silicon atoms, although the use of a polysiloxane of general formula (3) below having pendant Si—H groups and having Si—O—Si bonds on the backbone is preferred.

$$(R^4_r R^5_s H_t SiO_u)_v \qquad (3)$$

In formula (3), $R^4$ and $R^5$ are each independently a hydrogen, a substituted or unsubstituted monovalent hydrocarbon group, an alkoxy group or a halogen atom. Monovalent hydrocarbon groups that may be used include aliphatic, alicyclic and aromatic monovalent hydrocarbon groups. Suitable aliphatic or alicyclic monovalent hydrocarbon groups are those having 1 to 12 carbons, and especially 1 to 6 carbons, for example, alkyl groups such as methyl, ethyl, propyl, butyl, pentyl and hexyl and cycloalkyl groups such as cyclopentyl and cyclohexyl. Suitable aromatic monovalent hydrocarbon groups include those having 6 to 14 carbons, and preferably 6 to 10 carbons, such as phenyl, tolyl, xylyl, naphthyl and benzyl. Suitable substituted aliphatic, alicyclic and aromatic monovalent hydrocarbon groups include the aforementioned unsubstituted monovalent hydrocarbon groups on which some or all of the hydrogen atoms have been replaced with substituents such as halogen atoms, alkoxy groups, amino groups or aminoalkyl groups. Specific examples of such substituted monovalent hydrocarbon groups include monofluoromethyl, trifluoromethyl and m-dimethylaminophenyl. Suitable alkoxy groups include those having 1 to 4 carbons, such as methoxy, ethoxy and isopropoxy. Suitable halogen atoms include fluorine, chlorine and bromine. The use of methoxy and ethoxy as $R^4$ and $R^5$ is generally preferred.

In formula (3), the letter r is from 0.1 to 1, and preferably from 0.5 to 1; s is from 0.1 to 1, and preferably from 0.5 to 1; and t is from 0.01 to 1, and preferably from 0.1 to 1. The sum r+s+t is from 2 to 2.5, and preferably from 2 to 2.2. In addition, u is from 1 to 1.5; and v is an integer from 2 to 100,000, and preferably from 10 to 10,000.

Step 1 of forming a layer of the silicon compound on the silica surface may be carried out by dissolving the silicon compound in an organic solvent, adding and mixing the silica powder into the solution, then removing the organic solvent so as to leave a layer of the silicon compound on the surface of the silica.

Suitable examples of the organic solvent which may be used to dissolve the silicon compound in this step include aromatic hydrocarbon solvents such as benzene, toluene and xylene; aliphatic hydrocarbon solvents such as hexane, octane and cyclohexane; ether solvents such as tetrahydrofuran and dibutyl ether; ester solvents such as ethyl acetate; polar aprotic solvents such as dimethyl-formamide, dimethylsulfoxide and hexamethylphosphoric triamide; and nitromethane and acetonitrile.

The silicon compound-containing solution typically has a concentration of from 0.01 to 30% by weight, and preferably 1 to 10% by weight. At less than 0.01% by weight, the large amount of solvent required tends to increase costs excessively. On the other hand, at a concentration above 30%, the silicon compound may not form sufficiently as a layer over the entire surface of the powder.

Preferred methods for treating the silica powder with the silicon compound-containing organic solvent solution include a stirring technique in which the silicon compound is dissolved in a solvent to form a dilute state which is then mixed with the silica powder, and the resulting slurry is stirred with an agitating element in a vessel to effect dispersion and contact; and a spray technique in which the same slurry is dispersed in a stream of air to effect instantaneous drying.

In the above-described treatment step, the organic solvent is driven off by raising the temperature and/or applying a vacuum. It is generally effective to carry out drying by stirring at a temperature above the boiling point of the solvent, such as a temperature of about 40 to 200° C. under a vacuum of 1 to 100 mmHg.

Following treatment, by placing the treated powder in a drying atmosphere or heating it for a while at about 40 to 200° C. under reduced pressure, the solvent can be effectively removed. Drying of the treated powder in this manner yields a silicon compound-treated silica powder.

The silicon compound layer has a thickness in a range of preferably 0.001 to 1 $\mu$m, and especially 0.01 to 0.1 $\mu$m. At less than 0.001 $\mu$m, the silica may not be completely covered, as a result of which improperly plated areas may arise in a later step. On the other hand, at a thickness greater than 1 $\mu$m, the amount of silicon compound used may become so large as to entail excessive costs.

Silicon compound treatment renders the silica powder hydrophobic. The treated silica powder thus has a lowered affinity with the solvent used to dissolve the metal salt and may not disperse well therein, lowering the efficiency of the metal salt reduction reaction. Such a decline in the efficiency of the metal salt reduction reaction can be countered by the addition of a surfactant. Preferred surfactants are those which lower the surface tension without inducing the formation of foam. Illustrative examples of surfactants suitable for this purpose include the nonionic surfactants Surfynol 104, 420 and 504, all products of Nisshin Chemical Industry Co., Ltd.

In the next step (Step 2), the powder obtained in step 1 by forming a silicon compound layer on the silica surface is treated with a solution containing a metal salt of a metal having a standard redox potential of at least 0.54 V to induce the deposition of a colloid of the metal onto the silicon compound layer. This step involves contacting the surface of the silicon compound-treated powder with a metal salt-containing solution. The reducing action of the silicon compound causes a colloid of the metal to form on the surface of the silicon compound film, resulting in the formation of a metal film.

Suitable examples of the salts of a metal having a standard redox potential of at least 0.54 V which may be used in this step include salts of gold (standard redox potential, 1.50 V), palladium (standard redox potential, 0.99 V) or silver (standard redox potential, 0.80 V). Salts of metals having a standard redox potential lower than 0.54 V, such as copper (standard redox potential, 0.34 V) and nickel (standard redox potential, 0.25 V), are not easily reduced by the silicon compound.

The gold salt is a salt containing $Au^+$ or $Au^{3+}$, such as $NaAuCl_4$, $NaAu(CN)_2$ and $NaAu(CN)_4$. The palladium salt is a salt containing $Pd^{2+}$, which can generally be expressed in the form $PdZ_2$, wherein Z is a halogen such as chlorine, bromine or iodine, acetate, trifluoroacetate, acetylacetonate, carbonate, perchlorate, nitrate, sulfate or oxide. Specific examples of suitable palladium salts include $PdCl_2$, $PdBr_2$, $PdI_2$, $Pd(OCOCH_3)_2$, $Pd(OCOCF_3)_2$, $PdSO_4$, $Pd(NO_3)_2$ and PdO. The silver salt is a salt which dissolves in the solvent to form $Ag^+$ ions, and can generally be represented as AgZ, wherein Z is perchlorate, borate, phosphate or sulfonate. Specific examples of suitable silver salts include $AgBF_4$, $AgClO_4$, $AgPF_6$, $AgBPh_4$ (wherein "Ph" stands for phenyl), $Ag(CF_3SO_3)$ and $AgNO_3$.

Suitable examples of the solvent used to dissolve the metal salt include water, ketones such as acetone and methyl ethyl ketone, alcohols such as methanol and ethanol, and polar aprotic solvents such as dimethylformamide, dimethylsulfoxide and hexamethylphosphoric triamide. Of these, water is preferred.

The concentration of the metal salt varies according to the solvent used to dissolve the salt, although a concentration within a range of from 0.01% by weight to the saturation concentration is preferred. At less than 0.1% by weight, the plating catalyst may not be adequately effective, whereas a concentration greater than that needed to give a saturated solution often results in the precipitation of solid salt. When the solvent is water, the metal salt concentration is preferably within a range of 0.01 to 20%, and especially 0.1 to 5%. The silicon compound-treated powder is generally immersed in the metal salt solution at a temperature within a range of room temperature to 70° C. for a period of about 0.1 to 120 minutes, and preferably about 1 to 15 minutes, thereby forming a metal colloid-treated powder.

Step 2 is preferably carried out by first contacting the silicon compound-treated powder with a water-diluted surfactant, then contacting the powder with the above-described metal salt solution. This makes it possible to prevent the decrease in efficiency of the metal salt reducing reaction that would otherwise arise from the hydrophobizing effect of silicon compound treatment in step 1 on the silica surface, which reduces affinity of the powder to the metal salt-dissolving solvent and thus discourages dispersion of the powder in the solution. Thus, by first contacting the silicon compound-treated powder with a water-diluted surfactant, the silicon compound-treated powder can be easily and rapidly dispersed in the metal salt-containing solution.

The surfactant used for this purpose may be an anionic surfactant, cationic surfactant, amphoteric surfactant or nonionic surfactant.

Suitable anionic surfactants include sulfonate, sulfate, carboxylate and phosphate surfactants. Suitable cationic surfactants include ammonium salt, alkylamine salt and pyridinium salt surfactants. Suitable amphoteric surfactants include betaine, aminocarboxylic acid and amine oxide surfactants. Suitable nonionic surfactants include ether, ester and silicone surfactants.

Specific types of anionic surfactants that may be used include alkylbenzenesulfonates, sulfosuccinates, alkyl polyoxyethylenesulfates, alkyl phosphates, and long-chain fatty acid soaps. Cationic surfactants that may be used include alkyltrimethylammonium chloride, dialkyldimethylammonium chloride and alkylpyridinium chloride. Amphoteric surfactants that may be used include betaine sulfonates and betaine aminocarboxylates. Nonionic surfactants that may be used include polyoxyethylene alkyl ethers, polyoxyethylene fatty acid esters and polyoxyalkylene-modified polysiloxanes. Use can also be made of commercially available aqueous solutions of surfactant mixtures, such as those manufactured by Lion Corporation under the trade name Mama Lemon.

If necessary, any surfactant as described above may be used in an amount of 0.0001 to 10 parts, preferably 0.001 to 1 part, and especially 0.01 to 0.5 part, per 100 parts of the metal salt solution.

Following metal salt treatment, excess metal salt that has not been supported on the powder is removed by treatment with the same type of solvent as described above, but containing no metal salt, after which the powder is dried to remove unwanted solvent. Drying is preferably carried out at a temperature of 0 to 150° C., either under atmospheric pressure or in a vacuum.

In Step 3, electroless nickel plating is carried out using as the catalyst the metal colloid that has been deposited on the surface of the powder particles, thereby forming a layer of metallic nickel on the surface of the silicon compound layer.

The electroless nickel plating solution generally contains a water-soluble metallic nickel salt such as nickel sulfate or nickel chloride, a reducing agent such as sodium hypophosphite, hydrazine or sodium borohydride, a pH modifier such as sodium acetate, and a complexing agent such as phenylenediamine or sodium potassium tartrate. A commercial electroless nickel plating solution may be used for the purposes of the invention.

The electroless nickel plating process may be carried out in accordance with normal practice. That is, use may be made of a batch process in which plating is effected by adding the powder to the electroless plating solution, or a dropwise addition process in which the plating solution is gradually added to the powder dispersed in water (see *Dodensei fira no kaihatsu to oyo* (Development and use of electrically conductive fillers), Gijutsu Joho Kyokai, 1994, p. 182). Whichever method is used, it is important to control the plating rate so as to prevent agglomeration of the particles and obtain a uniform nickel film that adheres well. However, it can sometimes be difficult to obtain such nickel-coated silica. For example, in powders having a high specific surface area to allow plating reaction to be very active, the plating reaction tends to start abruptly and becomes impossible to control. Conversely, the start of plating may be delayed due to the influence of ambient oxygen, in which case nickel plating takes a long time and is less likely to yield a uniformly plated powder.

Accordingly, it is advantageous to effect nickel plating on silica by the following process. The nickel plating solution is divided into an aqueous solution containing, for example, a reducing agent, pH modifier and complexing agent, and an aqueous solution of the nickel salt. The silica is dispersed in the aqueous solution containing the reducing agent, pH modifier and complexing agent, and is held at the optimal temperature for nickel plating. The nickel salt solution is then added by entrainment with a gas to the reducing agent-containing aqueous solution in which the silica has been dispersed. We have found this process to be very effective for preparing nickel-coated silica free of agglomeration. The gas used to entrain the nickel salt solution has the effect of rapidly and uniformly dispersing this solution in the aqueous solution containing the reducing agent, pH modifier and complexing agent, thereby plating the surface of the powder with nickel.

The introduction of gas sometimes lowers the plating efficiency due to foaming, but this can be prevented by the addition of an antifoaming surfactant. The surfactant used for this purpose should be one which has an antifoaming action that lowers the surface tension. Suitable surfactants include polyether-modified silicone surfactants such as KS-538 (made by Shin-Etsu Chemical Co., Ltd.).

In electroless nickel plating, the oxygen concentration in the plating solution exerts an influence on the precipitation of nickel. A large amount of dissolved oxygen interferes with nickel deposition, either by causing the colloidal palladium serving as the plating catalyst nuclei to oxidize to palladium cations, which then dissolve into the plating solution, or by oxidizing the surface of the nickel that has already been deposited. On the other hand, the presence of too little dissolved oxygen lowers the stability of the plating solution, causing nickel to deposit in places other than on the silica and resulting in the formation of fine nickel dust or bumpy deposits. It is therefore preferable for the amount of dissolved oxygen in the plating solution to be maintained within a range of 1 to 20 ppm. The presence of more than 20 ppm of oxygen may result in a decline in the plating rate and the emergence of unplated areas, whereas less than 1 ppm may lead to the formation of bumpy deposits.

The gas used for the above purpose is preferably a mixture of an oxygen-containing gas such as air and an inert gas such as argon or nitrogen. In the powder plating process, plating is often slow to begin, but once it does begin, reaction runaway may occur. One effective way to keep this from happening is to use nitrogen at the beginning and, after confirming that the nickel plating reaction has begun, to subsequently switch over to air. Typically, the plating temperature is from 35 to 120° C., and the catalyst contact time is from 1 minute to 16 hours. Treatment conditions of 40 to 85° C. and 10 to 60 minutes are preferred.

Step 4, which follows the above-described electroless nickel plating step, is to carry out gold plating so as to form a layer of gold on the deposited layer of nickel.

The gold plating solution may be an electroplating solution or an electroless plating solution. Use may be made of a solution of known composition or a commercial product, although an electroless gold plating solution is preferred. The gold plating process may be carried in accordance with the conventional plating process described above. It is effective to carry out gold plating after using a dilute acid to remove the surface of the nickel that has been passivated by oxidation. The gold plating temperature and catalyst contact time are the same as in nickel plating.

At the end of the plating process, the treated powder should be rinsed with water to remove unwanted surfactant. The powder obtained from this process is a metal-plated silica powder having a silica/silicon compound/nickel/gold four-layer construction.

The nickel layer has a thickness within a range of preferably 0.01 to 10.0 $\mu$m, and especially 0.1 to 2.0 $\mu$m. At less than 0.01 $\mu$m, it may be difficult to obtain a metal-plated silica powder in which the silica is completely covered, and which has sufficient hardness and strength. On the other hand, at a thickness greater than 10.0 $\mu$m, the amount of nickel becomes large and the specific gravity high, which may make the metal-plated silica powder too expensive for compounding in the silicone rubber composition of the invention.

The gold layer has a thickness within a range of preferably 0.001 to 1.0 $\mu$m, and especially 0.01 to 0.1 $\mu$m. At less than 0.001 $\mu$m, the resistivity becomes so high that compounding of the metal-plated silica powder may fail to impart the inventive composition with sufficient electrical conductivity. On the other hand, at a thickness greater than 1.0 $\mu$m, the amount of gold used may become so great as to be prohibitively expensive.

Finally, it is advantageous for the metal-plated silica powder obtained by the process described above to be heat treated in the presence of an inert gas such as $N_2$ or a reducing gas such as $H_2$ and at a temperature of at least 200° C. The treatment conditions are typically a temperature of 200 to 900° C., and a treatment time of 1 minute to 24 hours, although treatment conditions of 250 to 500° C. and 30 minutes to 4 hours are preferred. Such heat treatment converts the silicon compound situated between the silica powder and the metal to a ceramic, which has a higher heat resistance, insulating properties and adhesion. Carrying out heat treatment in a reducing atmosphere such as hydrogen decreases the amount of oxide in the metal and transforms the silicon compound to a more stable structure, resulting in strong bonding between the silica and the metal, and ultimately giving a powder having a high electrical conductivity.

Heat treatment in such a hydrogen reducing environment converts the silicon compound primarily to a silicon carbide ceramic. That is, the above-described high temperature treatment converts some or all of the silicon compound between the silica powder and the metal film to a ceramic, which has a higher heat resistance, insulating properties and adhesion than the silicon compound.

The metal-plated silica powder may be imparted with affinity to silicone by administering hydrophobic treatment using, for example, any of various alkoxysilanes, titanate treatment agents, carbon-functional silanes, silazanes, or silanol-containing oligomeric siloxanes.

The inventive composition may include, together with component (C), another electrically conductive material, examples of which include known conductive inorganic substances such as conductive carbon black, conductive zinc oxide and conductive titanium oxide; and/or an extender, examples of which include fillers such as silicone rubber powder, red iron oxide and calcium carbonate.

The amount of component (C) included in the inventive composition is 30 to 700 parts by weight, and preferably 50 to 600 parts by weight, per 100 parts by weight of the organopolysiloxane serving as component A. The use of less than 30 parts by weight may fail to provide the desired low electrical resistance, whereas an amount greater than 700 parts by weight may compromise the processability of the composition to such an extent as to render injection molding impossible.

Component (D) is an adhesive aid or tackifier for imparting adhesion to the composition of the invention. The adhesive aid is not critical as long as it can impart adhesion. Useful adhesive aids include silane coupling agents and titanium coupling agents although preferred adhesive aids are compounds containing at least one alkoxy and/or epoxy group in a molecule; organosilicon compounds having in a molecule at least two different groups selected from among SiH, epoxy, alkoxy and alkenyloxy groups; and organosilicon compounds having in a molecule at least one SiH group and at least one group containing an aromatic ring and/or a carbonyl group.

Representative of these adhesive aids are organosilicon compounds of the following classes (i), (ii) and (iii), which may be used alone or in admixture of any.

(i) Organosilicon compounds having at least one, preferably at least two, more preferably at least three, alkoxy group attached to a silicon atom in a molecule, represented by the following average compositional formula (4).

$$R^6_b R^7_c (OR^8)_d SiO_{(4-b-c-d)/2} \quad (4)$$

Herein, $R^6$ is a substituted or unsubstituted monovalent hydrocarbon group, $R^7$ is a monovalent organic group having a functional group capable of addition reaction or condensation reaction, $R^8$ is a substituted or unsubstituted monovalent hydrocarbon group, b, c and d are numbers satisfying $0 \leq b \leq 3$, $0 \leq c \leq 3$, $0 < d \leq 4$, and $0 < b+c+d \leq 4$.

(ii) Organosilicon compounds such as organohydrogenpolysiloxanes having at least one, preferably at least two, more preferably at least three, SiH group in a molecule, represented by the following average compositional formula (5).

$$R^9_e H_f SiO_{(4-e-f)/2} \quad (5)$$

Herein, $R^9$ is a substituted monovalent hydrocarbon group, e and f are numbers satisfying $0 < e \leq 3$, $0 < f \leq 3$, and $1 \leq e+f < 4$.

(iii) Organosilicon compounds having in a molecule at least one, preferably at least two, more preferably at least three, SiH group and at least one, preferably 1 to 4, substituted or unsubstituted, divalent or trivalent aromatic ring and/or carbonyl group.

Referring to formula (4), $R^6$ stands for substituted or unsubstituted monovalent hydrocarbon groups, preferably of 1 to 8 carbon atoms and free of aliphatic unsaturation, for example, alkyl groups such as methyl, ethyl, propyl, isopropyl, butyl, isobutyl, tert-butyl, hexyl, cyclohexyl and octyl, aryl groups such as phenyl, tolyl and xylyl, aralkyl groups such as benzyl and phenylethyl, and halo- and cyano-substituted hydrocarbon groups in which some or all of the hydrogen atoms on the foregoing hydrocarbon groups are replaced by halogen atoms or cyano groups, such as chloromethyl, bromoethyl, 3,3,3-trifluoropropyl 3-chloropropyl and cyanoethyl.

$R^7$ stands for monovalent organic groups having a functional group capable of addition reaction or condensation reaction, examples of which include groups of the formula: $CH_2=CR-COO(CH_2)_n-$ wherein R is hydrogen or methyl and n is an integer of 1 to 8, such as (meth) acryloxypropyl; alkenyl groups of 2 to 6 carbon atoms such as vinyl, allyl, propenyl, isopropenyl and butenyl; groups of the formula: $H_2N-(CH_2)_n-$ wherein n is an integer of 1 to 8, such as aminopropyl; groups of the formula: $HS-(CH_2)_n-$ wherein n is an integer of 1 to 8, such as mercaptopropyl; and groups of the formula: $G-(CH_2)_n-$ wherein G is an epoxy-containing group as shown below and n is an integer of 1 to 8, such as glycidyloxypropyl.

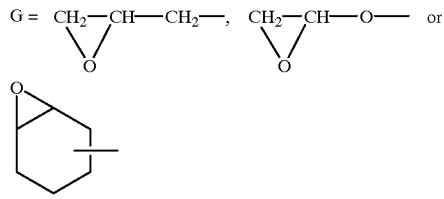

$R^8$ stands for substituted or unsubstituted monovalent hydrocarbon groups, preferably of 1 to 8 carbon atoms. Examples are the same as described for $R^1$, although preferred examples are alkyl and alkoxy-substituted alkyl groups, such as methyl, ethyl, propyl, butyl, pentyl, octyl, methoxyethyl, methoxymethyl, ethoxyethyl and ethoxymethyl.

Subscripts b, c and d are numbers satisfying $0 \leq b \leq 3$, preferably $0 \leq b \leq 2$, $0 \leq c \leq 3$, preferably $0 < c < 2$, $0 < d \leq 4$, preferably $1 \leq d < 4$, more preferably $2 \leq d \leq 3$, and $0 < b+c+d \leq 4$, preferably $1 \leq b+c+d \leq 3$.

Specifically, the compounds of formula (4) are classified into tetra(organooxy)silanes such as tetraalkoxysilanes, organotri(organooxy)silanes such as organotrialkoxysilanes, diorganodi(organooxy)silanes such as diorganodialkoxysilanes, and organooxy group-bearing siloxanes including organoalkoxysiloxanes having two to several silicon atoms and alkoxysiloxanes having two to several silicon atoms, available as partial hydrolytic condensates of the foregoing silane compounds. The organooxy group-bearing siloxanes including organoalkoxysiloxanes and alkoxysiloxanes may have linear, cyclic, branched or network structures and may be either homopolymers or copolymers although those siloxanes which are liquid at room temperature are often preferred.

Illustrative examples of the compounds of formula (4) include vinyltrimethoxysilane, vinyltriethoxysilane, vinyltris(β-methoxyethoxy)silane, γ-methacryloxypropyltrimethoxysilane, γ-methacryloxypropyltriethoxysilane, γ-acryloxypropyltrimethoxysilane, allyltrimethoxysilane, allyltriethoxysilane, γ-mercaptopropyltrimethoxysilane, N-β-(aminoethyl)-γ-aminopropyltrimethoxysilane, γ-aminopropyl-triethoxysilane, mercaptoethyltriethoxysilane, γ-glycidoxypropyltrimethoxysilane, β-(3,4-epoxycyclohexyl)-ethyltrimethoxysilane, tetramethoxysilane, tetraethoxysilane, tetrapropoxysilane, tetrabutoxysilane, and partial hydrolytic condensates of one or more of the foregoing silanes.

Referring to formula (5), $R^9$ is typically an epoxy group-substituted hydrocarbon group or an alkoxy or alkenyloxy group-containing group.

The epoxy group-substituted hydrocarbon groups are such that an epoxy group is attached to a silicon atom through a divalent hydrocarbon group such as alkylene as represented by the above formula: $G-(CH_2)_n-$, such as, for example, γ-glycidoxypropyl and β-(3,4-epoxycyclohexyl) ethyl. In the alkoxy or alkenyloxy group-containing hydrocarbon groups, exemplary alkoxy groups include alkoxy groups of 1 to 4 carbon atoms such as methoxy, ethoxy, propoxy, isopropoxy, butoxy, isobutoxy, tert-butoxy, methoxymethoxy, methoxyethoxy, ethoxymethoxy, and ethoxyethoxy, and exemplary alkenyloxy groups include alkenyloxy groups of 2 to 8 carbon atoms such as vinyloxy, propenyloxy, and allyloxy. The preferred alkoxy or alkenyloxy group-containing groups have the formula:

—X—SiY$_y$Z$_z$ wherein X is a $C_{1-12}$ alkylene group which may be separated by one or more COO, CONH, OCONH, CO or oxygen atoms, Y is alkoxy or alkenyloxy group, Z is a $C_{1-6}$ alkyl group or phenyl group, y is 1, 2 or 3, and z is 0, 1 or 2, with y+z=3. Illustrative examples are γ-methyldimethoxysilylpropyl, γ-dimethylmethoxysilylpropyl, γ-trimethoxysilylpropyl, and γ-triethoxysilylpropyl.

The hydrogen atom to be attached to a silicon atom (to form a SiH group) may be attached to a silicon atom at the end of the molecular chain, that is, a silicon atom in a monofunctional siloxane unit represented by $=SiO_{1/2}$, although it is preferably attached to a silicon atom midway the molecular chain, that is, a silicon atom in a difunctional siloxane unit represented by $=SiO_{2/2}$.

In formula (5), subscripts e and f are numbers satisfying $0<e≦3$, preferably $1≦e≦2$, $0<f≦3$, preferably $0.1≦f≦1$, and $1≦e+f<4$, preferably $1.6≦e+f≦3$. The organosilicon compound or organopolysiloxane of formula (5) may be linear, branched or cyclic.

Preferably the organosilicon compound of formula (5) has a viscosity of about 1 to 1,000 centipoise (cp) at 25° C. and especially about 5 to 200 cp at 25° C.

Illustrative, non-limiting, examples of the organosilicon compound of formula (5) are given below.

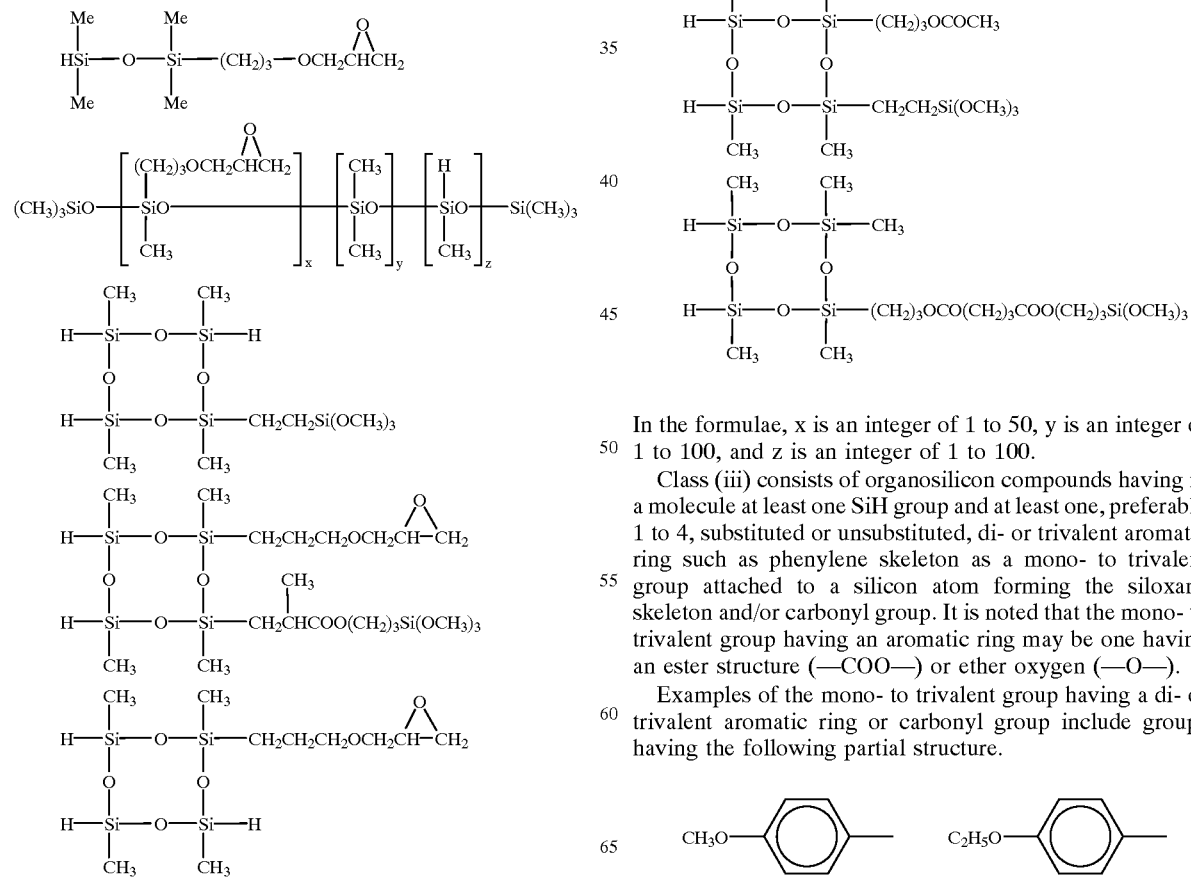

In the formulae, x is an integer of 1 to 50, y is an integer of 1 to 100, and z is an integer of 1 to 100.

Class (iii) consists of organosilicon compounds having in a molecule at least one SiH group and at least one, preferably 1 to 4, substituted or unsubstituted, di- or trivalent aromatic ring such as phenylene skeleton as a mono- to trivalent group attached to a silicon atom forming the siloxane skeleton and/or carbonyl group. It is noted that the mono- to trivalent group having an aromatic ring may be one having an ester structure (—COO—) or ether oxygen (—O—).

Examples of the mono- to trivalent group having a di- or trivalent aromatic ring or carbonyl group include groups having the following partial structure.

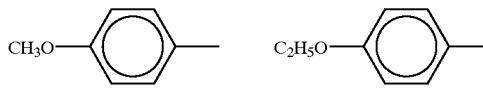

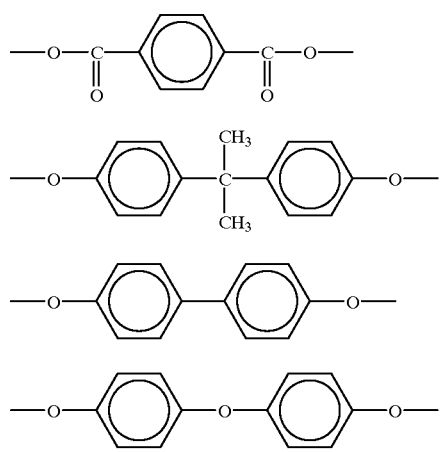
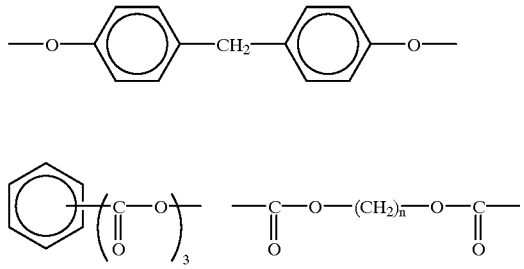
Herein, n is an integer of 1 to 6.
Illustrative examples of the organosilicon compounds (iii) are given below.
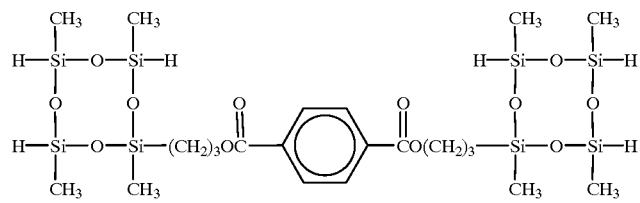
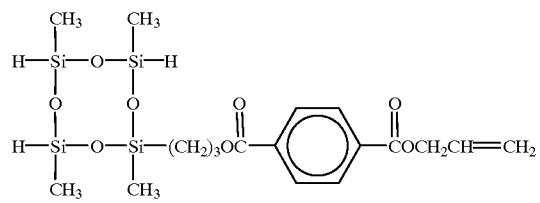
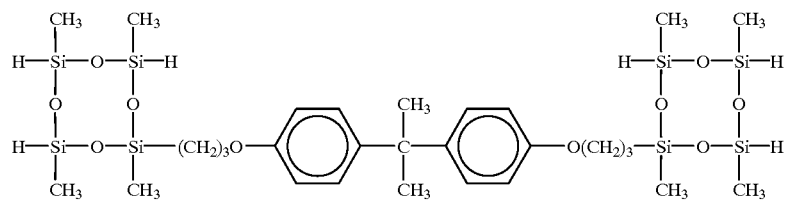
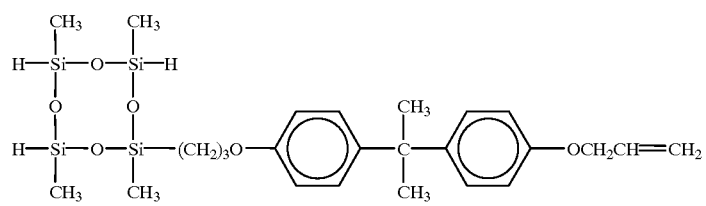

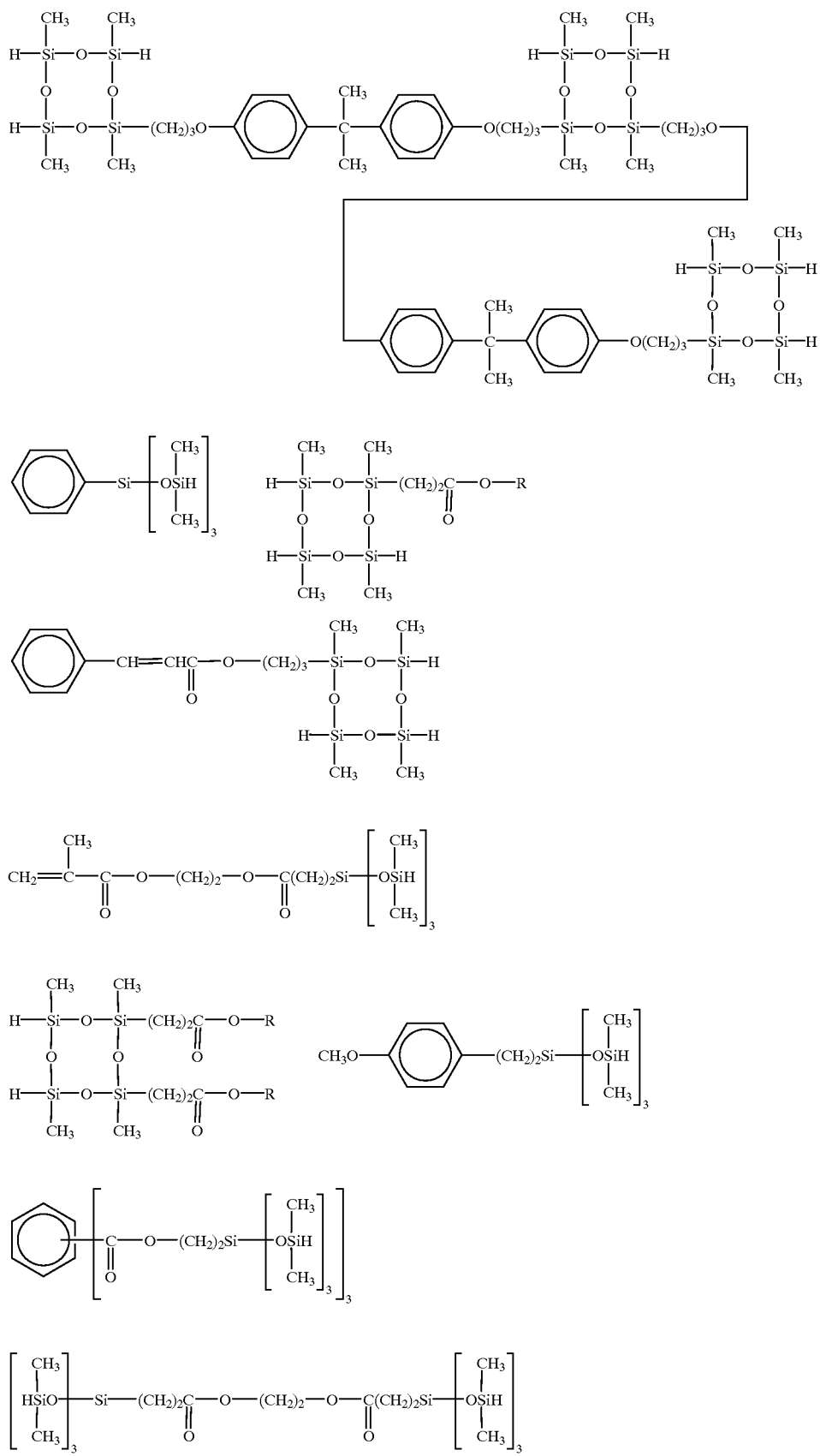

Of the organosilicon compounds of classes (ii) and (iii), those compounds having mono- to trivalent cyclic methylhydrogensiloxane structures as shown below as a partial structure within their molecule are preferred.

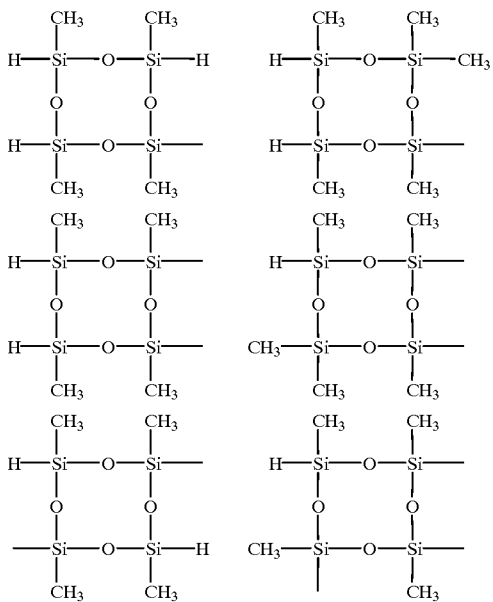

The adhesive aid (D) is added in an amount of 0.1 to 20 parts by weight per 100 parts by weight of the organopolysiloxane (A). Less than 0.1 part of the adhesive aid fails to impart the desired self adhesiveness whereas more than 20 parts of the adhesive aid can adversely affect the physical properties of the rubber composition. The preferred amount of adhesive aid is 0.2 to 15 parts by weight.

Component (E) of the inventive silicone rubber composition is a curing agent. In the practice of the invention, the components described above are uniformly blended using a rubber compounding apparatus such as a two-roll mill, a Banbury mixer or a dough mixer (kneader). If necessary, the blend is heat-treated at atmospheric pressure or reduced pressure. The resulting electrically conductive liquid silicone rubber composition is then cured by adding and blending therein a suitable curing agent, thereby giving a rubber elastomer having a stable, high electrical conductivity. The curing process employed for this purpose may be an organic peroxide-based curing process or an addition curing process involving the use of an addition crosslinking agent and a catalyst.

In the organic peroxide-based curing process, use is made of organic peroxide curing agents, preferred examples of which include benzoyl peroxide, 2,4-dichlorobenzoyl peroxide, p-methylbenzoyl peroxide, 2,4-dicumyl peroxide, 2,5-dimethylbis(2,5-t-butylperoxy)hexane, di-t-butyl peroxide and t-butyl perbenzoate.

The organic peroxide may be used singly or as a combination of two or more thereof. The amount of organic peroxide addition is preferably 0.1 to 10 parts by weight, and especially 0.2 to 5 parts by weight, per 100 parts by weight of the organopolysiloxane (A). The addition of too little organic peroxide may result in inadequate crosslinkage, whereas the addition of more than the above range may fail to provide any additional improvement in the curing speed.

Curing processes which involve an addition reaction use as the curing agent an addition reaction-type curing agent composed of an organohydrogenpolysiloxane having at least two SiH groups in a molecule and a platinum metal-based addition reaction catalyst. The preferred organohydrogenpolysiloxane used herein has the following general formula (6).

In formula (6), $R^{10}$ is a substituted or unsubstituted monovalent hydrocarbon group of 1 to 10 carbon atoms, and is exemplified by the same groups as mentioned earlier for $R^1$ in formula (1). Groups free of aliphatic unsaturation are preferred, with methyl being most preferred. The letter g is a positive number from 0.7 to 2.1, and preferably from 1 to 2; h is a positive number from 0.002 to 1, and preferably from 0.01 to 0.9. The sum g+h is a positive number from 0.8 to 3, and preferably from 1.5 to 2.8.

The organohydrogenpolysiloxane acts as a crosslinking agent for component (A) in the presence of an addition reaction catalyst. Each molecule has at least two, and preferably at least three, hydrogen atoms bonded to silicon atoms. These Si—H groups may be positioned at the ends of the molecular chain, in the middle of the molecular chain, or in both places.

Illustrative examples of such organohydrogenpolysiloxanes include methylhydrogenpolysiloxane capped at both ends with trimethylsiloxy groups, dimethylsiloxane-methylhydrogenpolysiloxane copolymers capped at both ends with trimethylsiloxy groups, dimethylsiloxane capped at both ends with dimethylhydrogensiloxy groups, dimethylsiloxane capped at both ends with dimethylhydrogenpolysiloxy groups, dimethylsiloxane-methylhydrogenpolysiloxane copolymers capped at both ends with dimethylhydrogenpolysiloxy groups, methylhydrogenpolysiloxane-diphenylsiloxane-dimethylsiloxane copolymers capped at both ends with trimethylsiloxy groups, copolymers composed of $(CH_3)_2 HSiO_{1/2}$ units and $SiO_{4/2}$ units and copolymers composed of $(CH_3)_2HSiO_{1/2}$ units, $SiO_{4/2}$ units and $(C_6H_5)SiO_{3/2}$ units.

The organohydrogenpolysiloxane of above formula (6) has a molecular structure which may be linear, branched, cyclic or a three-dimensional network structure. The molecular weight is not critical, although the compound is preferably liquid at room temperature. The viscosity at 25° C. is in a range of preferably 0.1 to 1,000 cp, and especially 0.5 to 500 cp. Such an organohydrogenpolysiloxane may be prepared by a suitable known process.

The foregoing organohydrogenpolysiloxane is included in the silicone rubber composition in an amount of preferably 0.1 to 100 parts by weight, more preferably 0.3 to 50 parts by weight, and most preferably 0.5 to 20 parts by weight, per 100 parts by weight of the organopolysiloxane (A). Addition of too little organohydrogenpolysiloxane may result in inadequate crosslinkage, whereas addition in an amount greater than the above range may fail to provide the desired increase in curing rate.

It is particularly advantageous for the organohydrogenpolysiloxane to be added in an amount such that the molar ratio of hydrogen atoms bonded to silicon atoms (SiH groups) therein, relative to alkenyl groups in the organopolysiloxane (A), is from 0.3 to 20, and especially from 0.8 to 3.

The addition reaction catalyst may be selected from platinum catalysts such as platinum black, platinic chloride, the reaction product of chloroplatinic acid with a monohydric alcohol, a chloroplatinic acid-olefin complex and platinum bisacetoacetate, palladium catalysts and rhodium catalysts. The addition reaction catalyst is preferably included in an amount of about 0.1 to 2,000 ppm, and especially about 1 to 500 ppm, calculated as the platinum, palladium or rhodium metal, based on the weight of the organopolysiloxane (A).

Insofar as the desired effects of the invention are attainable, the silicone rubber composition may also have added thereto one or more addition reaction regulators selected from among triallyl isocyanate, alkyl maleates, acetylene alcohols such as ethynylcyclohexanol, modified silanes and siloxanes, hydroperoxide, tetramethylethylenediamine, benzotriazole, and mixtures thereof, as an optional component other than the above-described main components.

In addition to the components described above, the electrically conductive silicone rubber compositions of the invention may also include a non-reactive silicone oil to impart water repellency and sealing and slip properties. Illustrative examples of suitable silicone oils include linear dimethylpolysiloxane, diphenylpolysiloxane, phenylmethylpolysiloxane and hydroxyl group-bearing organopolysiloxane. If necessary, the composition may also include various additives, such as metal oxides, e.g., titanium oxide, iron oxide, cerium oxide, vanadium oxide, cobalt oxide, chromium oxide, and manganese oxide. Additional constituents that may be included, to the extent that the objects and effects of the invention are not compromised, include pigments, heat insulators, flame retardants, plasticizers and reaction regulators.

The electrically conductive liquid silicone rubber composition of the invention may be prepared by uniformly mixing the above-described components (A) to (E) and other, optional, components at room temperature. However, if necessary, it is possible to heat-treat all the components other than component (E) in a suitable apparatus such as a planetary mixer or kneader at a temperature of about 100 to 200° C. for a period of about 30 minutes to 4 hours, especially about 2 to 4 hours, and subsequently mix in component (E) to effect curing and molding. The molding method may be selected as appropriate for the viscosity of the mixture. Suitable molding methods include casting, compression molding, injection molding and transfer molding. Curing conditions of about 80 to 200° C. for about 3 minutes to 3 hours are generally preferred.

When the inventive composition is liquid, injection molding is advantageously employed. For injection molding purposes, it is preferable for the composition to have a viscosity of about 300 to 100,000 poises at 25° C., and especially about 1,000 to 5,000 poises at 25° C. When the inventive composition is of millable type, the advantageous molding method is compression molding.

The electrically conductive silicone rubber compositions of the invention are applied and cured to substrates of metals such as stainless steel, steel, aluminum and copper and resins such as polycarbonate (PC), polyethylene terephthalate (PET) and polybutylene terephthalate (PBT) without a need for application of primers. The cured coatings of the silicone rubber compositions are directly and integrally joined to the substrates to give articles which are useful as parts in various electrical equipment, electrical contacts, and sealants.

There have been described conductive silicone rubber compositions which have a low volumetric resistivity, a stable electrical resistance and can be cured into silicone rubber. The resulting silicone rubber is useful as electrical components and electrical contacts employed in high-conductivity applications.

EXAMPLES

Examples of the invention are given below by way of illustration and not by way of limitation. All parts are by weight.

Synthesis Example

Synthesis of Metal-Plated Silica Powder

Silicon Compound Treatment of Silica

Five grams of phenylhydrogenpolysilane (PPHS) was dissolved in 65 g of toluene, and the resulting solution was added to 100 g of spherical silica US-10 (Mitsubishi Rayon Co., Ltd., average particle size, 10 μm; specific surface area, 0.4 m$^2$/g) as the starting silica material. The mixture was agitated for one hour to form a slurry. The slurry was dried by driving off the 65 g of toluene in a rotary evaporator at a temperature of 80° C. and a pressure of 45 mmHg, yielding PPHS-treated spherical silica. The treated silica was then disintegrated using rollers or a jet mill.

Preparation of Palladium Colloid-Coated Silica

When poured into water, the PPHS-treated spherical silica floated at the water's surface because the silica had been rendered hydrophobic by the preceding treatment. One hundred grams of the PPHS-treated spherical silica was poured into 50 g of a 0.5% aqueous solution of Surfynol 504 (a surfactant manufactured by Nisshin Chemical Industry Co., Ltd.) and dispersed therein by stirring. Palladium treatment was carried out by adding 70 g of a 1% aqueous solution of PdCl$_2$ (palladium chloride content, 0.7 g; palladium content, 0.4 g) to 150 g of the silica-water dispersion, stirring for 30 minutes, then filtering and rinsing with water. This treatment yielded a grayish-black colored palladium colloid-coated silica composed of silica particles on the surface of which palladium colloid had been deposited. After separating off the resulting silica by filtration and rinsing it with water, the silica was immediately submitted to the nickel plating step.

Nickel Plating the Palladium Colloid-Coated Silica

One hundred grams of a mixed solution containing 2.0 M of sodium hypophosphite, 1.0 M of sodium acetate and 0.5 M of glycine diluted in ion-exchanged water was used as the reducing solution for nickel plating. The palladium colloid-coated silica prepared in the previous step was dispersed together with 0.5 g of KS-538 (an antifoaming agent made by Shin-Etsu Chemical Co., Ltd.) in the reducing solution for nickel plating. The liquid was heated from room temperature to 65° C. under vigorous agitation. Sodium hydroxide (2.0 M) diluted with ion-exchanged water was added dropwise to the reducing solution by carrying it with air, and nickel sulfate (1.0 M) diluted with ion-exchanged water was added at the same time by carrying it with nitrogen. This caused fine bubbles to form and the silica to turn black, indicating that metallic nickel had deposited over the entire surface of silica particles.

Gold Plating the Nickel-Plated Silica

One hundred grams of the commercial gold plating solution K-24N (manufactured by Kojundokagaku Kenkyusho K.K.) was used undiluted as the gold plating solution. The silica coated over the entire surface with metallic nickel that was obtained in the preceding step was dispersed in the gold plating solution. The dispersion was heated from room temperature to 95° C. under vigorous agitation, whereupon fine bubbles formed and the silica turned gold in color, indicating that gold had deposited onto the silica surface.

The silica which settled to the bottom of the plating solution was separated off by filtration, rinsed with water and dried at 50° C. for 30 minutes, following which it was fired in hydrogen within an electric furnace at 300° C. for one hour. Stereomicroscopic examination of the resulting silica showed the entire surface of the silica to be covered with gold. Palladium, nickel and gold were detected in IPC analysis of the gold-plated silica.

Identification of Electrically Conductive Silica Having a Silica-Silicon Compound-Nickel-Gold Construction The gold-plated silica was mixed into an epoxy resin (Araldite A/B), then cured. Electron microscopic examination of a slice of the cured mixture confirmed that the metal-plated silica particles had a two-layer construction composed of a silica portion and a multiple-phase plating portion.

This gold-plated silica was subjected to Auger electron spectroscopic analysis in which the constituent elements present in the depth direction were analyzed while ion etching the surface. The results showed that the silica had a four-layer construction comprising, in the depth direction: a gold layer, a nickel layer, a silicon compound layer (containing carbon and silicon), and a silica layer. Examination of the external appearance under a microscope showed that the gold-plated silica was gold in color. The specific gravity was 3.5. The gold layer had a thickness of 0.03 μm, and the nickel layer had a thickness of 0.25 m.

Properties of Conductive Silica Having a Silica-Silicon Compound-Nickel-Gold Construction The resistivity of the gold-plated silica was determined by filling a cylindrical cell having four terminals with the gold-plated silica. A current of 1 to 10 mA was passed through from an SMU-257 current source (manufactured by Keithley) via two terminals having surface areas of 0.2 cm$^2$ at either end of the cylinder, and the voltage drop across two terminals placed at an interval of 0.2 cm in the center of the cylinder was measured with a model 2000 Keithley nanovoltmeter. The resistivity was 2.2 mΩ·cm. The silica was ground in a mortar for one minute, then heat-treated at 200° C. for 4 hours, after which it was examined for changes in the properties. No change was noted in the appearance or resistivity.

Example 1

The following components were blended in the proportions indicated in Table 1, and agitated and mixed within a planetary mixer at room temperature for 2 hours.

Component (A): (a) Dimethylpolysiloxane capped at both ends with trivinylsiloxy groups and having a viscosity of 1,000 cp at 25° C.; and (b) dimethylpolysiloxane capped at both ends with dimethylvinylsiloxy groups and having a viscosity of 1,000 cp at 250° C.

Component (B): As the silica fine powder, dry silica (R-972, manufactured by Nippon Aerosil Co., Ltd.; BET specific surface area, 130 m$^2$/g).

Component (C): Silver powder having an average particle size of 8 μm.

Next, dicumyl peroxide and a compound of the following formula (7) were added as components (E) and (D), respectively, and mixing was carried out to uniformity at room temperature, thereby giving a silicone rubber composition. The composition was cured by heating at 165° C. for 10 minutes, yielding a silicone rubber sheet having dimensions of 80 mm×80 mm×2 mm (thick). The volumetric resistivity of the sheet was measured. The adhesion of the composition to various substrates was examined by a test procedure to be described later. The results are shown in

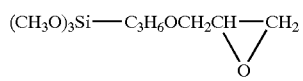

(7)

Example 2

As in Example 1, component (A) in the form of (c) dimethylpolysiloxane capped at both ends with dimethylvinylsiloxy groups and having a viscosity of 1,000 cp at 25° C. were blended with the same components (B) and (C) as in Example 1, and agitated and mixed for 2 hours. To the mixture were added dimethylhydrogenpolysiloxane of the following formula (8) and a 1% solution of chloroplatinic acid in 2-ethylhexanol as component (E), ethynylcyclohexanol as a reaction regulator, and the compound of formula (7) as component (D). The components were mixed to uniformity, thereby giving a silicone rubber composition. The composition was cured by heating at 165° C. for 10 minutes, yielding a silicone rubber sheet having dimensions of 80 mm×80 mm×2 mm (thick). The volumetric resistivity of the sheet was measured. The adhesion of the composition to various substrates was examined. The results are shown in Table 1.

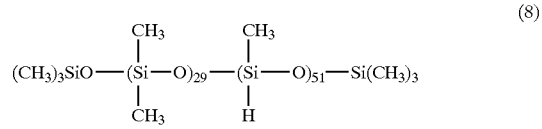

(8)

Example 3

Aside from the use, as component (C), of the gold-plated silica powder produced in the synthesis example instead of silver powder, the same components were mixed to uniformity at room temperature in the same manner as in Example 1, giving a silicone rubber composition. The composition was cured by heating at 165° C. for 10 minutes, yielding a sheet like that in Example 1. Measurements were carried out likewise. The results are shown in Table 1.

Example 4

Aside from the use of a compound of the following formula (9) as component (D), the same components were mixed to uniformity at room temperature in the same manner as in Example 1, giving a silicone rubber composition. The composition was cured by heating at 165° C. for 10 minutes, yielding a sheet like that in Example 1. Measurements were carried out likewise. The results are shown in Table 1.

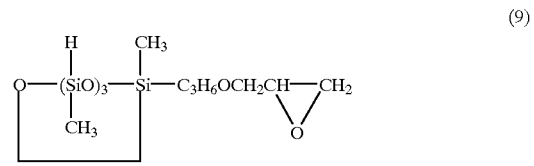

(9)

Example 5

Aside from the use of a compound of the following formula (10) as component (D), the same components were mixed to uniformity at room temperature in the same manner as in Example 1, giving a silicone rubber composition. The composition was cured by heating at 165° C. for 10 minutes, yielding a sheet like that in Example 1. Measurements were carried out likewise. The results are shown in Table 1.

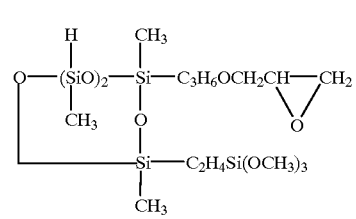

(10)

Example 6

Aside from the use of a compound of the following formula (11) as component (D), the same components were mixed to uniformity at room temperature in the same manner as in Example 2, giving a silicone rubber composition. The composition was cured into a sheet as in Example 2. Measurements were carried out likewise. The results are shown in Table 1.

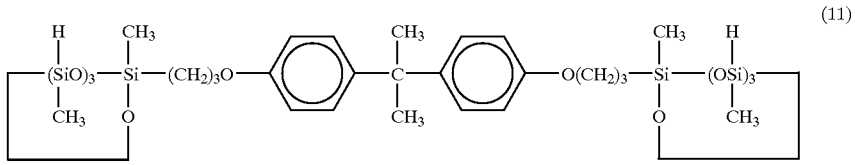
(11)

Example 7

Aside from the change of component (C), the same components were mixed to uniformity at room temperature in the same manner as in Example 1, giving a silicone rubber composition. The conductive metal-plated powder (C) used herein was metal-plated alumina having a nickel-gold structure which was prepared by the same procedure as in the synthesis example except that the silica core was replaced by aluminum oxide whose primary particles had an average particle size of 20 nm (Oxide C by Nippon Aerosil Co., Ltd.). The resulting composition was cured by heating at 165° C. for 10 minutes, yielding a sheet like that in Example 1. Measurements were carried out likewise. The results are shown in Table 1.

Example 8

Aside from the change of component (C), the same components were mixed to uniformity at room temperature in the same manner as in Example 1, giving a silicone rubber composition. The conductive metal-plated powder (C) used herein was metal-plated resin having a nickel-gold structure which was prepared by the same procedure as in the synthesis example except that the silica core was replaced by spherical particles of polymethyl methacrylate resin having a particle size of 1 μm. The resulting composition was cured by heating at 165° C. for 10 minutes, yielding a sheet like that in Example 1. Measurements were carried out likewise. The results are shown in Table 1.

Comparative Example 1

A silicone rubber sheet was prepared as in Example 1 except that component (D) was omitted. Measurements were carried out likewise. The results are shown in Table 1.

Adhesion of the silicone rubber composition to a substrate was examined by integrally molding the composition to the substrate by means of a press, peeling the cured coating at an angle of 180°, and rating according to the following criterion.

OK: 100% rubber failure

Fair: rubber failure/interfacial peeling

NG: interfacial peeling

The substrates included those of polycarbonate (PC), polyethylene terephthalate (PET), polybutylene terephthalate (PBT), iron (Fe) and stainless steel (SUS).

TABLE 1

| | Components (pbw) | | E1 | E2 | E3 | E4 | E5 | E6 | E7 | E8 | CE1 |
|---|---|---|---|---|---|---|---|---|---|---|---|
| (A) | Organopolysiloxane (a) | | 50 | | 50 | 50 | 50 | | 50 | 50 | 50 |
| | Organopolysiloxane (b) | | 50 | | 50 | 50 | 50 | | 50 | 50 | 50 |
| | Organopolysiloxane (c) | | | 100 | | | | 100 | | | |
| (E) | Organic peroxide | | 0.6 | | 0.6 | 0.6 | 0.6 | | 0.6 | 0.6 | 0.6 |
| | Organohydrogenpolysiloxane | | | 6 | | | | 6 | | | |
| | Platinum catalyst | | | 0.2 | | | | 0.2 | | | |
| | Reaction regulator | | | 0.1 | | | | 0.1 | | | |
| (B) | Dry silica R-972 | | 5 | 5 | 5 | 5 | 5 | 5 | 5 | 5 | 5 |
| (C) | Silver powder | | 400 | 400 | | 400 | 400 | 400 | | | 400 |
| | Metal-plated silica | | | | 200 | | | | | | |
| | Metal-plated alumina | | | | | | | | 300 | | |
| | Metal-plated resin | | | | | | | | | 250 | |
| (D) | Adhesive aid (7) | | 8 | 8 | 8 | | | | 8 | 8 | |
| | Adhesive aid (9) | | | | | 8 | | | | | |
| | Adhesive aid (10) | | | | | | 8 | | | | |
| | Adhesive aid (11) | | | | | | | 8 | | | |
| Volumetric resistivity (Ω · cm) | | | 3.3 × 10⁻⁵ | 3.4 × 10⁻⁵ | 2.2 × 10⁻⁵ | 3.5 × 10⁻⁵ | 3.4 × 10⁻⁵ | 2.0 × 10⁻⁵ | 3.5 × 10⁻⁵ | 3.8 × 10⁻⁵ | 3.3 × 10⁻⁵ |
| Adhesion | Resin | PC | OK | OK | OK | OK | OK | OK | OK | OK | NG |
| | | PET | OK | OK | OK | OK | OK | OK | OK | OK | NG |
| | | PET | OK | OK | OK | OK | OK | OK | OK | OK | NG |
| | Metal | Fe | OK | OK | OK | OK | OK | Fair | OK | OK | NG |
| | | SUS | OK | OK | OK | OK/Fair | OK/Fair | Fair | OK | OK | NG |

It is evident from Table 1 that the silicone rubber compositions of the invention have high conductivity and can be joined to resin and metal substrates by integral molding without a need for a primer. This leads to an improved productivity and a reduced manufacturing cost.

Japanese Patent Application No. 2000-247413 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

What is claimed is:

1. An electrically conductive silicone rubber composition having improved adhesion, comprising
   (A) 100 parts by weight of an organopolysiloxane having at least two aliphatic unsaturated groups in a molecule,
   (B) 0.1 to 100 parts by weight of finely divided silica,
   (C) 30 to 700 parts by weight of an electrically conductive powder having a construction comprising an inorganic filler or a resin particle covered with a nickel layer, which in turn is covered with a gold layer,
   (D) 0.1 to 20 parts by weight of an adhesive aid, and
   (E) a curing agent in an amount sufficient to cure the organopolysiloxane,
   wherein component (D) is an organosilicon compound having in a molecule at least one SiH group and at least one group containing an aromatic ring and/or a carbonyl group.

2. The silicone rubber composition of claim 1, wherein component (C) is a metal-plated silica powder having a construction comprising silica covered with a nickel layer which in turn is covered with a gold layer.

3. The silicone rubber composition of claim 1, wherein the curing agent (E) is an organic peroxide.

4. The silicone rubber composition of claim 1, wherein the curing agent (E) is an addition reaction-type curing agent comprising an organohydrogen-polysiloxane having at least two SiH groups in a molecule and a platinum group metal catalyst.

5. An article comprising a substrate of a metal or resin and a coating of the conductive silicone rubber composition of claim 1 applied and cured to the substrate without a primer, the cured coating of the composition being integrated with the substrate.

6. The silicone rubber composition of claim 1, wherein the metal-plated powder has a silicon-based polymeric compound with a reducing property between the inorganic filler or resin and the nickel.

7. The silicone rubber composition of claim 2, wherein the metal-plated silica powder has a silicon-based polymeric compound with a reducing property between the silica and the nickel.

8. The silicone rubber composition of claim 7, wherein the silicon-based polymeric compound with a reducing property is one selected from the group consisting of polysilanes, polycarbosilanes, polysiloxanes and polysilazanes having silicon-silicon or silicon-hydrogen bonds.

9. The silicone rubber composition of claim 2, wherein the metal-plated silica powder has a ceramic between the silica and the nickel formed by heat treating a silicon-based compound with a reducing property between the silica and the nickel in the presence of an inert gas at a temperature of at least 200° C. to convert the silicon-based polymeric compound to the ceramic.

10. The silicone rubber composition of claim 1, wherein component (C) is a powder having an average particle size within a range of 0.05 to 100 $\mu$m.

11. The silicone rubber composition of claim 1, wherein component (C) is a powder having an average particle size within a range of 0.1 to 10 $\mu$m.

12. The silicone rubber composition of claim 1, wherein component (C) is a powder having a specific surface area of at most 1 $m^2/g$.

13. The silicone rubber composition of claim 1, wherein component (C) is present in an amount of 50 to 600 parts by weight.

14. An electrically conductive silicone rubber composition having improved adhesion, comprising:
   (A) 100 parts by weight of an organopolysiloxane having at least two aliphatically unsaturated groups in a molecule,
   (B) 0.1 to 100 parts by weight of finely divided silica,
   (C) 30 to 700 parts by weight of an electrically conductive powder having a construction comprising an inorganic filler or a resin particle covered with a nickel layer, which is in turn covered with a gold layer,
   (D) 0.1 to 20 parts by weight of an adhesive aid, and
   (E) a curing agent in the form of an organic peroxide in an amount sufficient to cure the organopolysiloxane.

* * * * *